(12) United States Patent
Taneja et al.

(10) Patent No.: US 8,813,505 B2
(45) Date of Patent: Aug. 26, 2014

(54) METHOD FOR CONDITIONING A POWER SUPPLY FOR STARTING A JET ENGINE

(75) Inventors: Dinesh Nath Taneja, Vandalia, OH (US); Krishna Jonnalagadda, Mason, OH (US); Pranav N. Patel, West Chester, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 226 days.

(21) Appl. No.: 13/552,071

(22) Filed: Jul. 18, 2012

(65) Prior Publication Data

US 2014/0020401 A1  Jan. 23, 2014

(51) Int. Cl.
*F02C 7/22* (2006.01)
*F02C 7/26* (2006.01)

(52) U.S. Cl.
USPC ............. 60/778; 60/786; 60/787; 60/788; 60/790; 60/39.091; 60/794; 60/772; 244/53 A

(58) Field of Classification Search
USPC ............. 60/786–788, 790, 778, 39.091, 794; 244/53 A
See application file for complete search history.

(56) References Cited

U.S. PATENT DOCUMENTS

| 7,117,683 | B2* | 10/2006 | Thompson ............... 60/786 |
| 7,210,653 | B2 | 5/2007 | Atkey et a |
| 2006/0168968 | A1* | 8/2006 | Zielinski et al. ............... 60/778 |
| 2007/0022995 | A1 | 2/2007 | Marchand et al. |
| 2007/0095321 | A1 | 5/2007 | Marchand et al. |
| 2007/0267540 | A1* | 11/2007 | Atkey et al. ............... 244/58 |
| 2008/0078592 | A1 | 4/2008 | Akasam et al. |
| 2013/0306790 | A1* | 11/2013 | Bruno et al. ............... 244/58 |

OTHER PUBLICATIONS

Auxiliary Power Unit, http://www.b737.org.uk/apu.htm, Apr. 24, 2012, 7 pages.
Gultstream G150 Airplane Flight Manual, Sep. 10, 2006, 14 pages.
Gulfstream G200—Electrical System, date prior to Jul. 18, 2012, 15 pages.

* cited by examiner

*Primary Examiner* — Craig Kim
(74) *Attorney, Agent, or Firm* — McGarry Bair PC

(57) ABSTRACT

Method for conditioning a power supply for starting a jet engine having an electrical starting system with an auxiliary power unit in parallel with a DC power supply.

7 Claims, 2 Drawing Sheets

METHOD FOR CONDITIONING A POWER SUPPLY FOR STARTING A JET ENGINE

BACKGROUND OF THE INVENTION

Modern commercial jet aircraft have jet engines that are started using a main jet engine starter/generator. An auxiliary power unit provides the power used to start the main jet engine starter/generator.

BRIEF DESCRIPTION OF THE INVENTION

The invention relates to a method for conditioning a power supply for starting a jet engine having an electrical starting system with an auxiliary power unit (APU), which is started by an AC starter/generator (AC S/G), which is started by a DC power supply. The method comprises converting the DC power supply to a first AC power supply; starting the AC S/G with the first AC power supply and outputting a second AC power supply; starting the APU with the second AC power supply and outputting from the APU a third AC power supply; converting the DC power supply to a fourth AC power supply that is combinable in parallel with the third AC power supply; combining in parallel the third AC power supply and the fourth AC power supply to form a fifth AC power supply; and starting the jet engine with the fifth AC power supply.

DESCRIPTION OF EMBODIMENTS OF THE INVENTION

Figure 1:
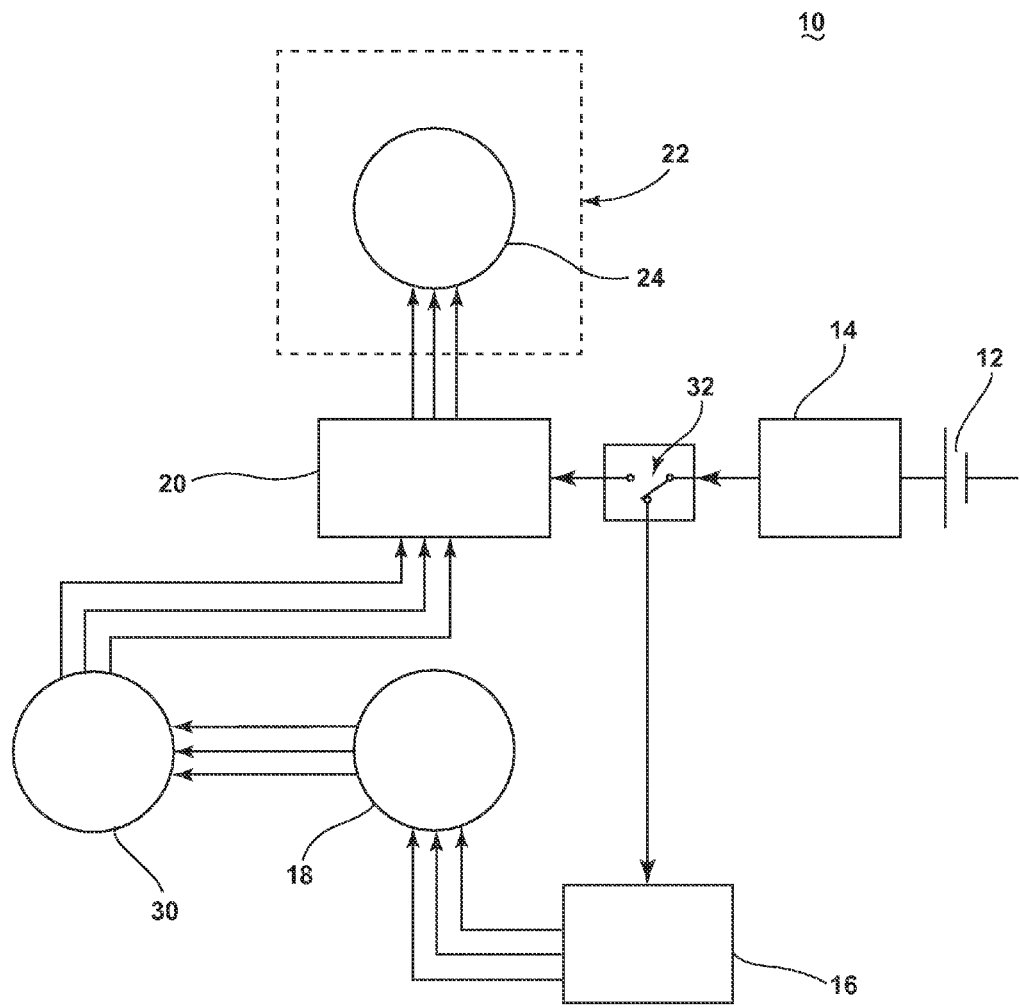
FIG. 1 is a diagrammatic view of an electrical starting system for a jet engine with an auxiliary power unit in parallel with a DC power supply according to a first embodiment of the invention.

FIG. 1 schematically illustrates an electrical starting system 10 for a jet engine 22. As a brief overview, the electrical starting system 10 may include a main starter generator (main S/G) 24 for the jet engine 22, an auxiliary power unit (APU) 30 for starting the main starter/generator 24, an AC starter/generator (AC S/G) for starting the APU, and a DC power supply 12 for starting the AC S/G. Power converters 14, 16, 20 provide the necessary power conversion for the DC power supply 12, AC S/G 18, APU 30 to ultimately provide a power supply matching that required by the main S/G 24 for starting.

Looking at the components of the electrical starting system 10 in individual detail, the DC power supply 12 may include one or more devices that produce direct current electricity. As embodied in FIG. 1, the DC power supply 12 is a battery cell, which for the illustrated embodiment is configured with 28 Vdc across its terminals. Batteries with other voltages may be used for the DC power supply. In other embodiments, the DC power supply may be any device capable of producing direct current electricity appropriately rated for the application. Examples including a ground power unit or a fuel cell could be implemented as a DC power supply.

The DC power supply 12 may be coupled to a first power converter 14. The first power converter 14, as well as power converters 16, 20, is an electrical or electromechanical device that modifies electrical energy attributes such as converting between alternating and direct current or changing the voltage or frequency. As shown, the first power converter 14 may be a DC-to-DC converter that changes the voltage level of an input power source to a second voltage level. A DC-to-DC converter is designed to output flat, constant voltage of direct current electricity. As embodied in FIG. 1, the first power converter 14 may be a step-up converter that outputs a higher voltage than the input voltage. The output voltage may be configured to be 270 Vdc for an input voltage of 28 Vdc.

The first power converter 14 may be coupled to the second power converter 16. As shown, the second power converter may be a DC-to-AC power converter. A DC-to-AC power converter is designed to output alternating current of a desired frequency and voltage. As embodied in FIG. 1, the second power converter 16 may produce an output at 115 Vac at 400 Hz for an input voltage of 270 Vdc although other voltages and frequencies are possible depending upon the requirements of the specific implementation. During the start cycle, the second power converter output is ramped up from zero volts to 115 Vac and frequency from zero to 400 Hz.

The second power converter 16 may be coupled to the AC S/G 18. The AC S/G 18 is a device that acts as a motor to start an engine and a generator after the engine is started. As embodied in FIG. 1, the AC S/G 18 may be a brushless AC S/G may produce an output at 115 Vac at 400 Hz for an input voltage of 115 Vac at 400 Hz, although other voltages and frequencies are possible depending on the requirements of the specific implementation. During the start cycle, the AC S/G output is ramped up from zero volts to 115 Vac and frequency from zero to 400 Hz.

The AC S/G 18 may be coupled to the APU 30. The APU 30 is a device, often used on an aircraft, for supplying electrical power for functions including the starting of the main jet engine 22. As embodied in FIG. 1, the APU 30 may produce an output at 115 Vac at 400 Hz for an input voltage of 115 Vac at 400 Hz, although other voltages and frequencies are possible depending on the requirements of the specific implementation. During the start cycle, the APU output is ramped up from zero volts to 115 Vac and frequency from zero to 400 Hz.

A third power converter 20 may be coupled to the APU 30 and the first power converter 14. Also, the third power converter 20 is coupled to the main jet engine starter/generator 24. As embodied in FIG. 1, the output of the DC-to-DC converter as a first power converter 14 may be coupled to the input of the third power converter 20 by a DC bus integrated into the third power converter 20. The third power converter 20 may produce an output at 115 Vac at 400 Hz from both a conditioned DC power source at 270 Vdc and an AC power source at 115 Vac at 400 Hz, although other voltages and frequencies are possible depending on the requirements of the specific implementation. During the start cycle, the third power converter output is ramped up from zero volts to 115 Vac and frequency from zero to 400 Hz.

A switch 32 is provided for selectively coupling the DC power supply 12 to either of the AC S/G 18 or the APU 30. As illustrated, the switch 32 is provided at the output of the DC-to-DC converter as a first power converter 14 and the input to either of the second power converter 16 and the third power converter 20. In the case where a DC-to-DC converter is not used, the switch would selectively couple the output of the DC power supply directly to either of the converters 16, 20.

To start the jet engine 22 with the electric starting system 10 of FIG. 1, power from the DC power supply 12, or battery cell, may be stepped up in voltage via the DC-to-DC converter as a first power converter 14. The power from the DC-to-DC converter as a first power converter 14 may then be initially coupled to the second power converter 16 to condition the output from the DC-to-DC converter to an alternating current as a first AC power supply having a first set of electrical characteristics, e.g. voltage, amperage, frequency, suitable for the AC S/G 18. The AC S/G 18 is then started with the power supplied from the second power converter 16. After starting, the AC S/G 18, acting as a starter, may then start the APU 30, with the output of the AC S/G functioning as a second AC power supply having a second set of electrical characteristics suitable for starting the APU 30, which may be different than the first set of electrical characteristics.

Upon being successfully started, the APU 30 may supply power as a third AC power supply having a third set of electrical characteristics to the third power converter 20. The third set of electrical characteristics may be different than either or both of the first and second electrical characteristics. At this time, the power supplied from the DC power supply 12, or battery cell, 12 may be selectively coupled, via the switch 32, to the third power converter 20 and conditioned as a fourth AC power supply that is combinable in parallel with the third AC power supply. The fourth set of electrical characteristics may be different than any of the first, second, and third set of electrical characteristics. By this method, the DC power supply 12 and the third AC power supply are simultaneously converted to the third AC power supply and the fourth AC power supply, respectively. Both supplies of electrical power that are input to the third power converter 20 may be conditioned by the third power converter 20 to supply power with voltage and frequency attributes suitable with starting the main jet engine 22 with the jet engine starter/generator 24. The conditioned power may then be delivered from the third power converter 20 as a fifth power supply having a fifth set of electrical characteristics suitable for starting the jet engine 22. The fifth power supply may then be used by the jet engine starter/generator to start the jet engine 22. The fifth set of electrical characteristics may be different than any of the first, second, third and fourth set of electrical characteristics.

Figure 2:
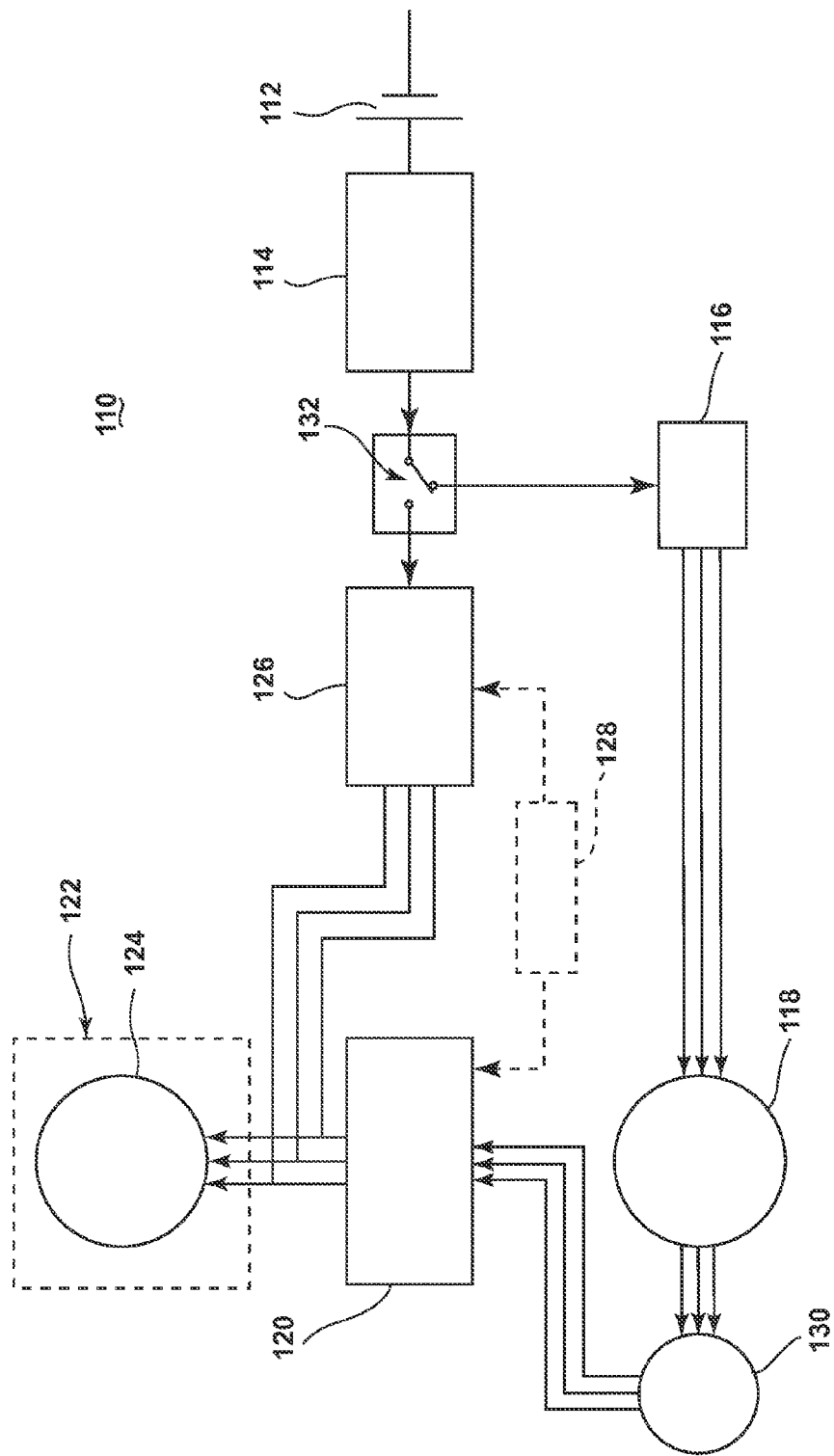
FIG. 2 is a diagrammatic view of an electrical starting system for a jet engine with an auxiliary power unit in parallel with a DC power supply according to a second embodiment of the invention.

Referring to FIG. 2, a second embodiment of the invention is shown. The second embodiment of the invention has substantially identical components as the first embodiment, with a different electrical coupling. Therefore similar parts of the second embodiment will be increased by 100. The second embodiment of the electrical starting system 110 differs from the first embodiment in that a fourth power converter 126 and communication link 128 are provided. The fourth power converter 126 may be electrically coupled to both the first power converter 114 and the main jet engine starter/generator 124. The fourth power converter 126 may condition the direct current, stepped-up voltage supplied from the first power converter 114 to the alternating current power as a fourth AC power supply having electrical characteristics suitable to assist in the start of the main jet engine starter/generator 124. The DC power supply 112 may still be used to assist in the start of the main jet engine starter/generator 124 in parallel with the APU 130, but may bypass the third power converter 120 that is used to condition the power supplied by the APU 130. Because the DC power supply 112 and the third AC power supply are separately converted to the third and fourth AC power supplies, a communication link 128 may be established between the third and fourth power converters 120, 126 to properly synchronize the two AC power supplies when they are combined in parallel.

The above described embodiments provide benefits including that the size of the APU 30, 130 may be reduced. The APU 30, 130 is normally rated to meet the main jet engine's starting requirements under worst case conditions, typically specified by the coldest ambient temperature expected to be encountered. By putting the APU in parallel with the existing on-board DC power supply 12, 112 that is used to start the AC S/G 18, 118, the APU rating may be reduced. By reducing the APU's rating, the size and weight of the device may be reduced. Reductions in the overall size and weight of the aircraft may result in improved fuel efficiency and cost savings.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for conditioning a power supply for starting a jet engine having an electrical starting system with an auxiliary power unit (APU), which is started by an AC starter/generator (AC S/G), which is started by a DC power supply, the method comprising:
    converting the DC power supply to a first AC power supply having a first set of electrical characteristics suitable for the AC S/G;
    starting the AC S/G with the first AC power supply and outputting a second AC power supply having a second set of electrical characteristics suitable for starting the APU;
    starting the APU with the second AC power supply and outputting from the APU a third AC power supply having a third set of electrical characteristics;
    converting the DC power supply to a fourth AC power supply that is combinable in parallel with the third AC power supply;
    combining in parallel the third AC power supply and the fourth AC power supply to form a fifth AC power supply having a fifth set of electrical characteristics suitable for starting the jet engine; and
    starting the jet engine with the fifth AC power supply.

2. The method of claim 1 wherein the DC power supply and the third AC power supply are simultaneously converted to the third AC power supply and the fourth AC power supply, respectively.

3. The method of claim 2 wherein the third and fourth AC power supplies are combined in parallel during the simultaneous conversion to form the fifth AC power supply.

4. The method of claim 1 wherein the DC power supply and the third AC power supply are separately converted to the third and fourth AC power supplies.

5. The method of claim 4 wherein the third and fourth AC power supplies are combined in parallel after the separate conversions to form the fifth AC power supply.

6. The method of claim 1 wherein the converting the DC power supply to the first AC power supply comprises stepping the DC power supply from 28 Vdc to 270 Vdc prior to the conversion to the first AC power supply.

7. The method of claim 6 wherein the 270 Vdc is converted to 115 Vac to form the first AC power supply.

* * * * *